(12) United States Patent
Binder et al.

(10) Patent No.: US 6,578,768 B1
(45) Date of Patent: Jun. 17, 2003

(54) METHOD AND DEVICE FOR SELECTING A RECONFIGURABLE COMMUNICATIONS PROTOCOL BETWEEN AND IC CARD AND A TERMINAL

(75) Inventors: Philip A. Binder, Ramsey, NJ (US); Philippe R. Hiolle, New York, NY (US); Barry Hochfield, Giffnock (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 09/646,602

(22) PCT Filed: Mar. 19, 1999

(86) PCT No.: PCT/US99/06012

§ 371 (c)(1),
(2), (4) Date: Dec. 21, 2000

(87) PCT Pub. No.: WO99/48039

PCT Pub. Date: Sep. 23, 1999

(30) Foreign Application Priority Data

Mar. 20, 1998 (GB) .............................. 9806069

(51) Int. Cl.$^7$ .............................................. G06K 19/06
(52) U.S. Cl. ........................................ 235/492; 705/43
(58) Field of Search ............................ 235/492, 380, 235/382.5; 705/39, 42, 43

(56) References Cited

U.S. PATENT DOCUMENTS

| | | | |
|---|---|---|---|
| 5,581,708 A | | 12/1996 | Iijima |
| 5,678,029 A | * | 10/1997 | Iijima .......................... 710/65 |
| 5,959,276 A | * | 9/1999 | Iijima .......................... 235/380 |

FOREIGN PATENT DOCUMENTS

| | | |
|---|---|---|
| EP | 0282992 | 9/1988 |
| EP | 0733987 | 9/1996 |
| EP | 0768540 | 4/1997 |

* cited by examiner

Primary Examiner—Mark Tremblay
(74) Attorney, Agent, or Firm—Baker Botts L.L.P.

(57) ABSTRACT

There is provided a method and device for selecting a communications protocol between an integrated circuit card and a terminal. The terminal supports at least two communications protocols, with one of the at least two communications protocols being a preferred communications protocol. The terminal transmits a reset to the integrated circuit card and receives an answer-to-reset from the integrated circuit card indicative of a first communications protocol. The terminal determines whether the first communications protocol matches the preferred communications protocol. If the first communications protocol does not match the preferred communications protocol, the terminal transmits another reset to the integrated circuit card and receives another answer-to-reset from the integrated circuit card indicatives of a second communications protocol. According to another aspect of the invention, the integrated circuit card has a processing unit and a memory coupled to the processing unit, the memory having stored therein a plurality of answers-to-reset, where each of the plurality of answers-to-reset is indicative of a communications protocol. The integrated circuit card transmits one of the plurality of answers-to-reset responsive to a reset and transmits another one of the plurality of answers-to-reset responsive to a subsequent reset.

30 Claims, 9 Drawing Sheets

METHOD AND DEVICE FOR SELECTING A RECONFIGURABLE COMMUNICATIONS PROTOCOL BETWEEN AND IC CARD AND A TERMINAL

BACKGROUND OF INVENTION

The present invention relates to a method and device for selecting a reconfigurable communications protocol between an integrated circuit ("IC") card and a terminal.

The interoperability of IC cards and terminals and the migration from existing IC card standards to new IC card standards are concerns in the IC card industry. With regard to achieving the interoperability of IC cards and IC card interface devices, the International Organization for Standardization (ISO), in conjunction with the International Electrotechnical Commission (IEC), has promulgated a series of standards pertaining to IC cards, specifically ISO/IEC 7816 parts 1 to 10. A problem with the ISO/IEC standards is that they are too broad and specify a range of functionality which is not practical to implement in its entirety. Because of the broad scope of the ISO/IEC standards, specifications covering IC cards have been developed and published that are tailored within the bounds of the ISO/IEC standards to satisfy the specific needs of certain industries. These specifications may be incompatible with each other and, thus, IC cards supporting a particular standard may not operate in terminals supporting a different standard. Therefore, notwithstanding the promulgation of the ISO/IEC standards, interoperability of IC cards and terminals remains a concern in the IC card industry.

Migration to new IC card standards is also a concern. As industry requirements change and new IC card standards are developed over time, migration to new standards may be problematic. Currently, the migration from an existing standard to a new standard within a region requires the re-terminalization of the region—i.e., before IC cards and applications compatible with the new IC card standard are issued and distributed within the region, the existing terminals in the region must be replaced in whole or in part with terminals supporting the new standard. This migration scheme is inefficient, however, because there may be a significant delay associated with the re-terminalization of a region.

Accordingly, there exists a need for a method and device for allowing the interoperability of various IC cards and terminals and for allowing the efficient migration from an existing IC card standard to a new IC card standard without re-terminalizing a region.

SUMMARY OF THE INVENTION

It is an object of the present invention to provide a method and device for allowing the interoperability of IC cards and terminals. It is also an object of the present invention to provide a method and device for allowing the efficient migration from an existing IC card standard to a new IC card standard.

In accordance with the present invention, there is provided a method for selecting a communications protocol between an integrated circuit card and a terminal, the terminal being capable of communicating using at least two communications protocols, with one of the at least two communications protocols being a preferred communications protocol. The method includes the steps of (a) transmitting a reset by the terminal to the integrated circuit card; (b) receiving an answer-to-reset by the terminal from the integrated circuit card indicative of a first communications protocol; (c) determining whether the first communications protocol matches the preferred communications protocol; (d) transmitting, if the first communications protocol does not match the preferred communications protocol, another reset by the terminal to the integrated circuit card; and (e) receiving another answer-to-reset by the terminal from the integrated circuit card indicative of a second communications protocol.

Preferably, the reset in step (a) is a cold reset and the reset in step (d) is a warm reset. Moreover, the method may further include the steps of: determining whether the second communications protocol matches any of the at least two communications protocols supported by the terminal; and aborting communications between the terminal and the integrated circuit card if the second communications protocol does not match any of the at least two communications protocols supported by the terminal.

The method may also include the steps of: determining whether the second communications protocol matches the first communications protocol; if the second communications protocol matches the first communications protocol, determining whether the second communications protocol matches any of the at least two communications protocols supported by the terminal; and aborting communications between the terminal and the integrated circuit card if the second communications protocol does not match any of the at least two communications protocols supported by the terminal. If the second communications protocol does not match the first communications protocol, the method may include the step of determining whether the second communications protocol matches the preferred communications protocol.

Preferably, the method further includes the steps of repeatedly transmitting a reset by the terminal to the integrated circuit card and receiving an answer-to-reset by the terminal from the integrated circuit card until the most current answer-to-reset is the same as a previous answer-to-reset or is indicative of the preferred communications protocol. In addition, it is preferred that the first communications protocol and the second communications protocol are compliant with, but different subsets of, the same communications protocol standard.

In accordance with the present invention, there is also provided a method for transmitting an answer-to-reset by an integrated circuit card, the integrated circuit card having a processing unit and a memory coupled to the processing unit, the memory having stored therein a plurality of answers-to-reset, each of the plurality of answers-to-reset being indicative of a communications protocol. The method includes: (a) transmitting one of the plurality of answers-to-reset responsive to a reset; and (b) transmitting another one of the plurality of answers-to-reset responsive to a subsequent reset.

Preferably, the plurality of answers-to-reset include a first answer-toreset indicative of a first communications protocol operable in a first geographic region and a second answer-to-reset indicative of a second communications protocol operable in a second geographic region, the second geographic region being greater than the first geographic region. Then, step (a) of the method may include transmitting the first answer-to-reset responsive to a cold reset; and step (b) of the method may include transmitting the second answer-to-reset responsive to a warm reset.

The memory of the integrated circuit card may include a pointer stored therein whose value is associated with one of the plurality of answers-to-reset. In that case, step (b) of the method may include: incrementing the pointer responsive to a reset; and transmitting the answer-to-reset associated with the incremented pointer responsive to the reset. The incrementing step may comprise incrementing the pointer responsive to a reset only if the pointer is less than the number of the plurality of answers-to-reset. The method may also include initializing the pointer to a predetermined value responsive to a cold reset.

In accordance with yet another aspect of the present invention, there is provided a terminal for communicating with an integrated circuit card. The terminal includes a processing unit; a memory unit coupled to the processing unit, the memory having stored therein values representative of at least two communications protocols, with one of the at least two communications protocols being a preferred communications protocol; means for transmitting a first reset by the terminal to the integrated circuit card; means for receiving a first answer-to-reset from the integrated circuit card responsive to the first reset and indicative of a first communications protocol; means for determining whether the first communications protocol matches the preferred communications protocol; means for transmitting, if the first communications protocol does not match the preferred communications protocol, a second reset by the terminal to the integrated circuit card; and means for receiving a second answer-to-reset from the integrated circuit card responsive to the second reset and indicative of a second communications protocol.

In accordance with yet another aspect of the present invention, there is provided an integrated circuit card. The integrated circuit card includes (a) a processing unit; (b) a memory coupled to the processing unit, the memory having stored therein a plurality of answers-to-reset, each of the plurality of answers-to-reset being indicative of a communications protocol; (c) means for transmitting one of the plurality of answers-to-reset responsive to a reset; and (d) means for transmitting another one of the plurality of answers-to-reset responsive to a subsequent reset.

In accordance with yet another aspect of the present invention, there is provided a method of migrating from a first communications protocol to a second communications protocol in a system including a plurality of integrated circuit cards and a plurality of terminals, which are capable of communicating with each other through the first communications protocol only. The method includes the step of issuing one or more integrated circuit cards supporting both the first communications protocol and the second communications protocol. The method may also include the step of replacing one or more of the terminals capable of communicating only through the first communications protocol with one or more terminals capable of communicating through the second communications protocol.

BRIEF DESCRIPTION OF THE DRAWINGS

The invention will be better understood from the following detailed description of exemplary embodiments thereof in conjunction with the accompanying drawings in which.

Throughout the figures of the drawings the same reference numerals or characters are used to denote like components or features of the invention.

DETAILED DESCRIPTION OF THE INVENTION

Figure 1A:
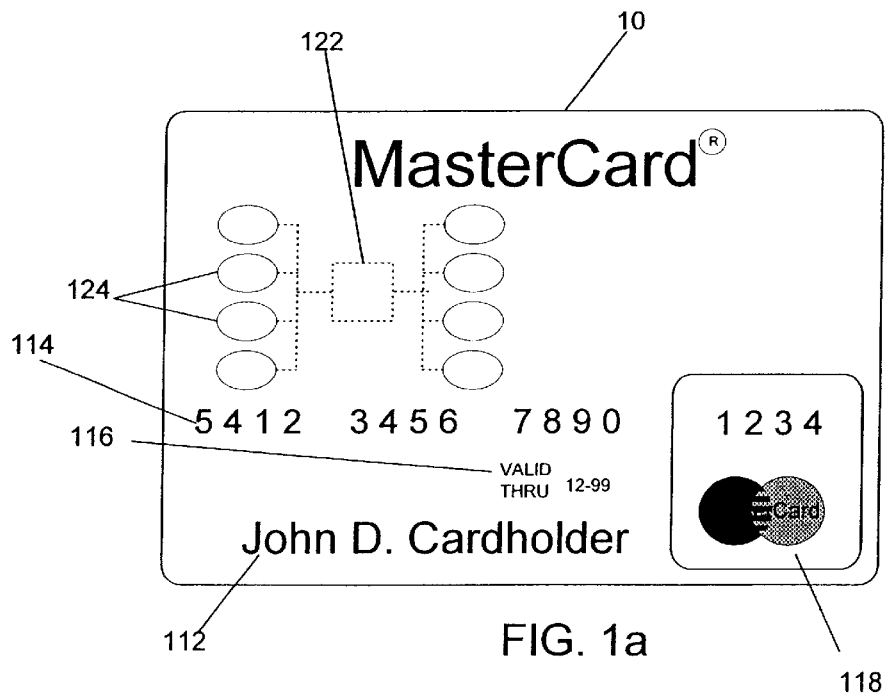
FIG. 1a is a front view of an IC card according to a preferred embodiment of the present invention.
Figure 1B:
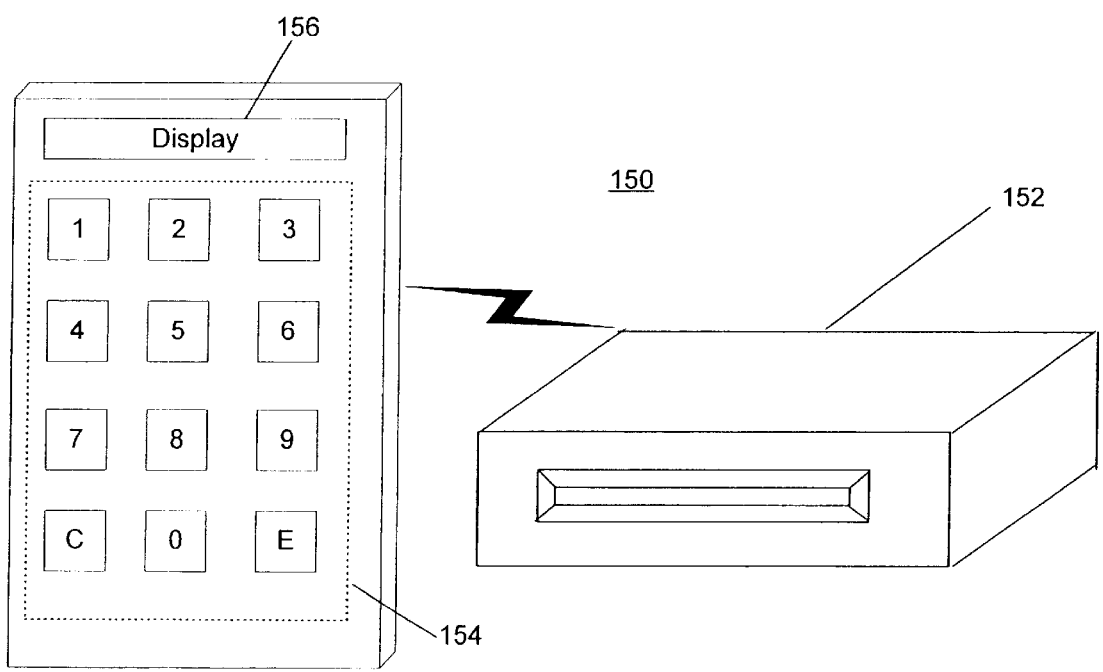
FIG. 1b is an isometric view of a terminal in which the IC card of FIG. 1a may be used.

The present invention relates generally to communication between an IC card 100, which is illustrated in FIG. 1a, and a terminal 150, which is illustrated in FIG. 1b. As used in this specification and the appended claims, the term "terminal" shall be used to generically describe devices with which an IC card may communicate.

The IC card 100 of FIG. 1a looks similar to a conventional credit card, but also includes an integrated circuit 122 therein and electrical contacts 124 for communication between the IC card 100 and the terminal 150. The ISO/IEC 7816-2 standard includes assignments for power, reset, clock, input/output, and ground signals for the electrical contacts 124.

The IC card 100 may be used as a credit card, a debit card, and an electronic cash card (i.e., a card containing monetary value that can be transferred when the cardholder makes purchases). As shown in FIG. 1a, similar to the conventional credit card, the front side of the IC card 100 preferably contains the cardholder's name 112, the cardholder's account number 114, the date until which the card is valid 116, and the logo 118 of the financial company whose services are used by the cardholder (e.g., MasterCard®).

As shown in FIG. 1b, the terminal 150 may include a card reader 152, a keypad 154, and a display 156. The keypad 154 and the display 156 allow a user of the IC card 100 to interact with the terminal 150. The keypad 154 allows the user to select a transaction, to enter a personal identification number ("PIN"), and to enter transactional information. The display 156 allows the user to receive informational messages and prompts for data entry. By way of example, a terminal may comprise a card reader in communication with or incorporated into a point-of-sale device, an ATM, a computer, and/or a telephone.

Figure 2:
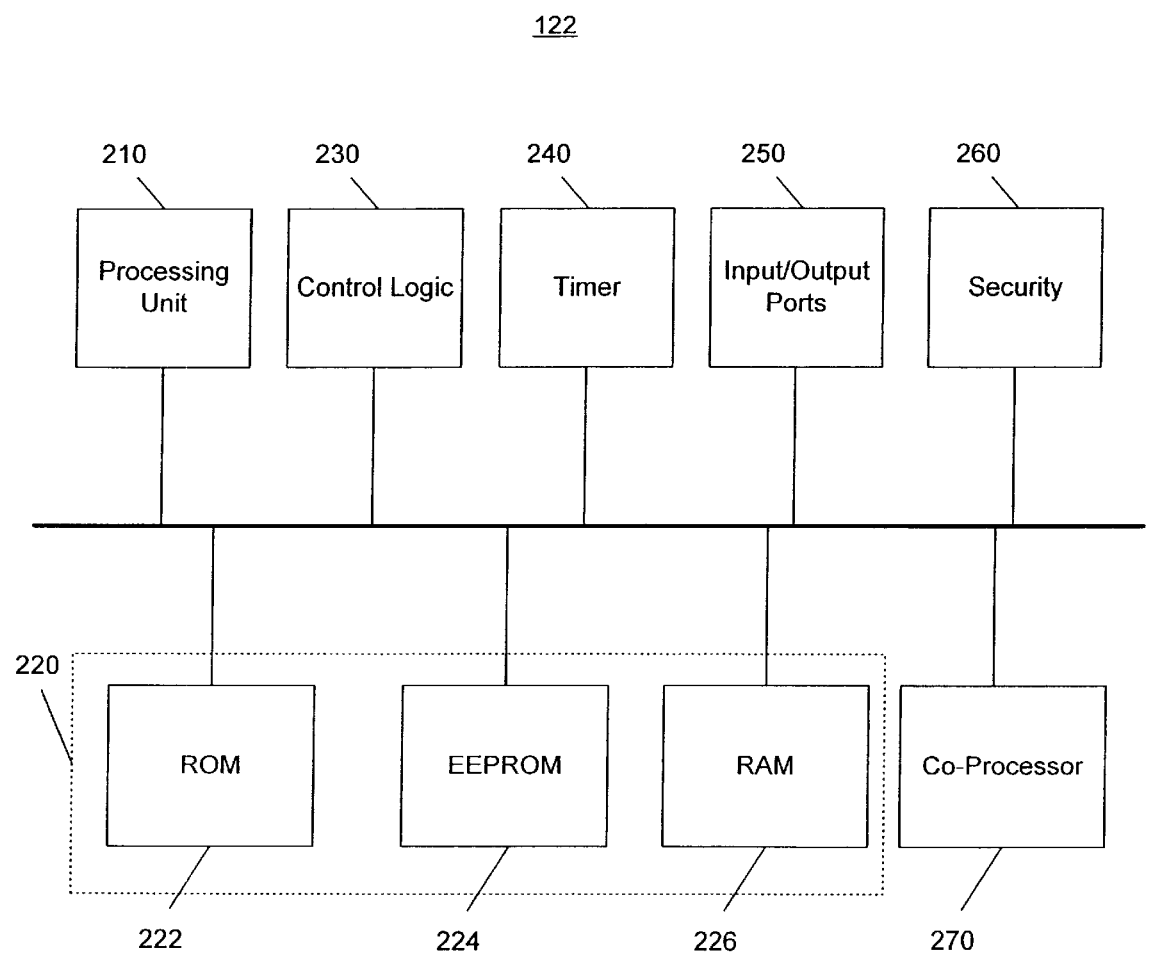
FIG. 2 is a functional block diagram of the integrated circuit of an IC card according to a preferred embodiment of the present invention.

FIG. 2 is a functional block diagram of a preferred embodiment of the integrated circuit 122 of the IC card 100. The integrated circuit 122 includes a processing unit 210, a memory unit 220, control logic 230, a timer 240, input/output ports 250, security circuitry 260, and a co-processor 270. The control logic 230 provides, in conjunction with the processing unit 210, the control necessary to handle communications between the memory unit 220 and the input/output ports 250. The timer 240 provides a timing reference signal for the processing unit 210 and the control logic 230. The security circuitry 260 preferably provides fusible links that connect the input/output ports 250 to internal circuitry for testing during manufacturing. The fusible links are burned after completion of testing to limit later access to sensitive circuit areas. The co-processor 270 provides the ability to perform complex computations in real time, such as those required by cryptographic algorithms.

The memory unit 220 may include different types of memory, such as volatile and non-volatile memory and read-only and programmable memory. For example, as shown in FIG. 2, the memory unit 220 may include read-only memory (ROM) 222, electrically erasable programmable read-only memory (EEPROM) 224, and random-access memory (RAM) 226.

Figure 3:
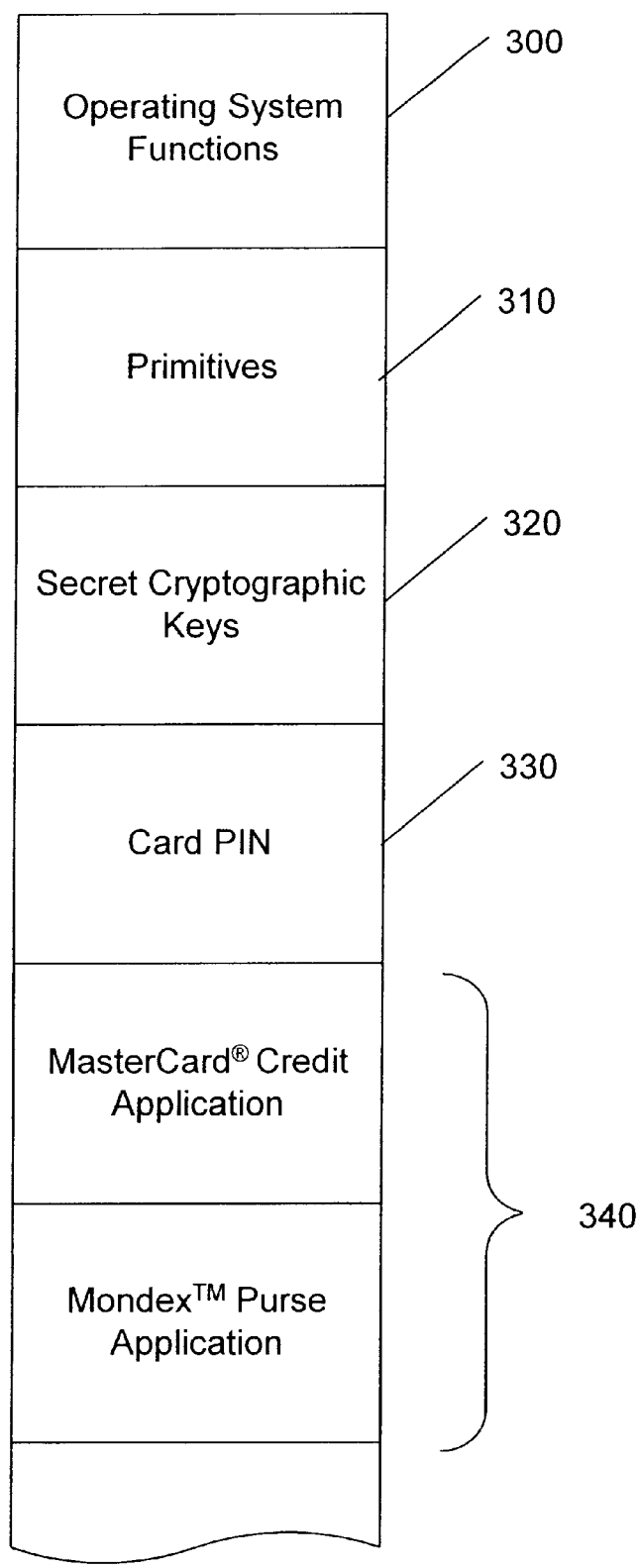
FIG. 3 is a memory map of a preferred embodiment of the integrated circuit of FIG. 2.

FIG. 3 shows a memory map of the memory unit 220 according to a preferred embodiment of the present invention. As shown in FIG. 3, the memory unit 220 stores therein unique IC card data such as secret cryptographic keys 320 and a card PIN 330. The secret cryptographic keys 320 may be any type of well-known cryptographic keys, such as the private keys of public-key pairs, which are used for authentication of the IC card and data stored in the IC card. The card PIN 330 may be used to lock and unlock access to the IC card. Preferably, the secret cryptographic keys 320 and the card PIN 330 are stored in a secure area of ROM or EEPROM that is either not accessible or has very limited accessibility from outside the IC card.

The memory unit 220 also stores the operating system 300 of the IC card 100. The operating system 300 loads and executes IC card applications and provides file management and other basic card services to the IC card applications.

The operating system 300 also handles the transmission of an ATR in response to a reset signal. Preferably, the operating system 300 is stored in a secure area of ROM.

In addition to the basic services provided by the operating system, the memory unit 220 may also include one or more IC card applications 340. For 20 example, if the IC card is to be used as an electronic cash card, the application Mondex™ Purse from Mondex International Limited might be included on the IC card, which loads an electronic value of a certain currency onto the IC card. In addition, if the IC card is to be used as a credit card, the MasterCard® Credit application from MasterCard® International Incorporated may be included on the IC card. Preferably, the operating system 300 of the IC card 100 should support multiple applications 340. An example of such an operating system is the MULTOS™ operating system from Mondex International Limited.

An IC card application may include both program and associated data files, which are typically stored in EEPROM. The application program may be written either in the native programming code of the processing unit 210 or it may be written in a higher level language that must be translated before it is executed on the processing unit 210. An example of such a higher level language for use on IC cards is the MULTOS™ Executable Language (MEL). Advantageously, by using a higher level language such as MEL, an application program is capable of running on multiple hardware platforms without any need for re-writing.

Because IC cards typically have limited memory capacity due to the size and cost restraints of placing memory on the IC cards, an IC card may also have primitives 310 stored in ROM, which are subroutines that perform frequently used functions or procedures, such as mathematical functions. The primitives 310 are usually written in the native language of the processing unit 210 so that they can be executed very quickly.

Figure 4A:
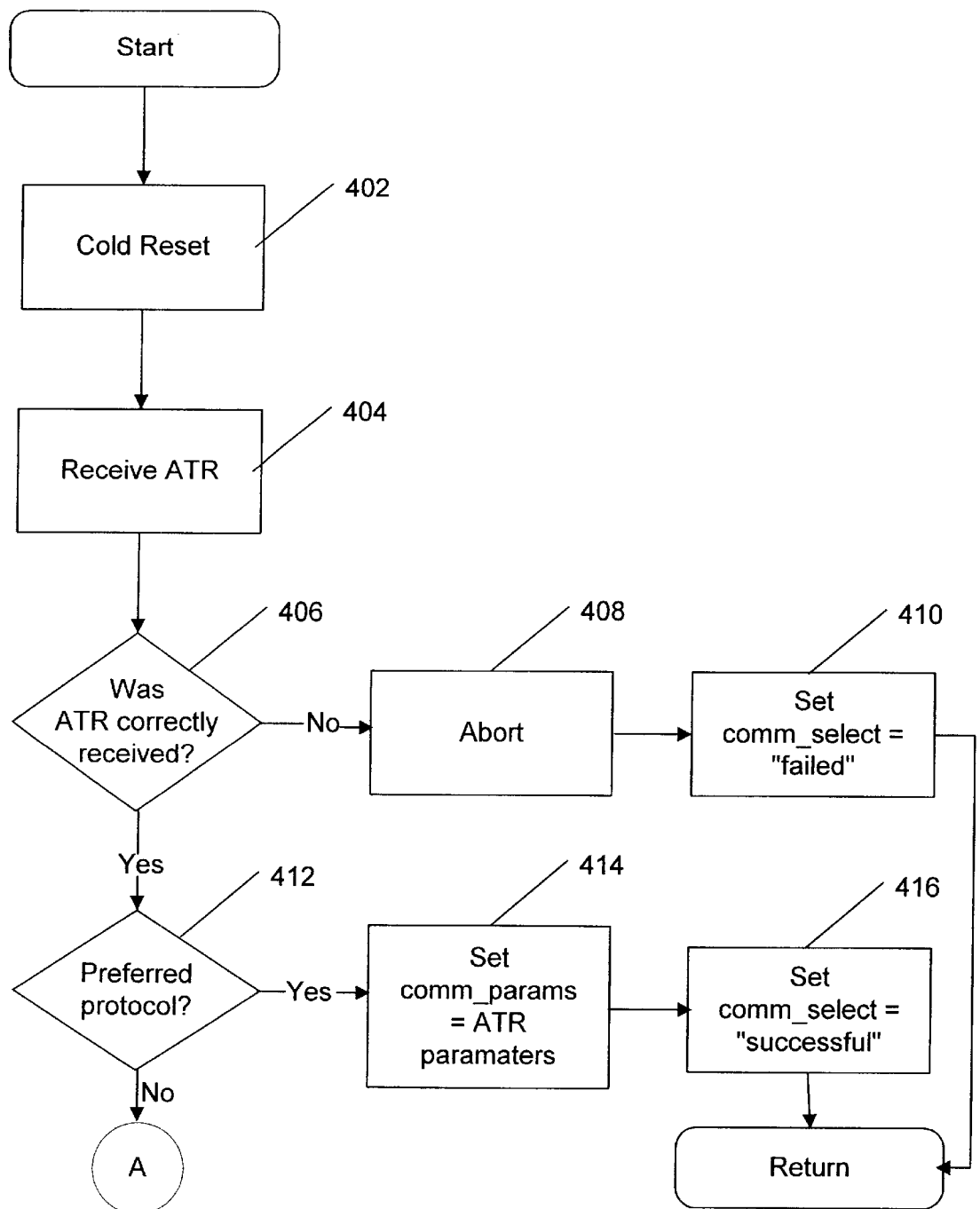
FIGS. 4a and 4b are flow charts of a communications protocol selection routine for execution on a terminal according to a preferred embodiment of the present invention.
Figure 4B:
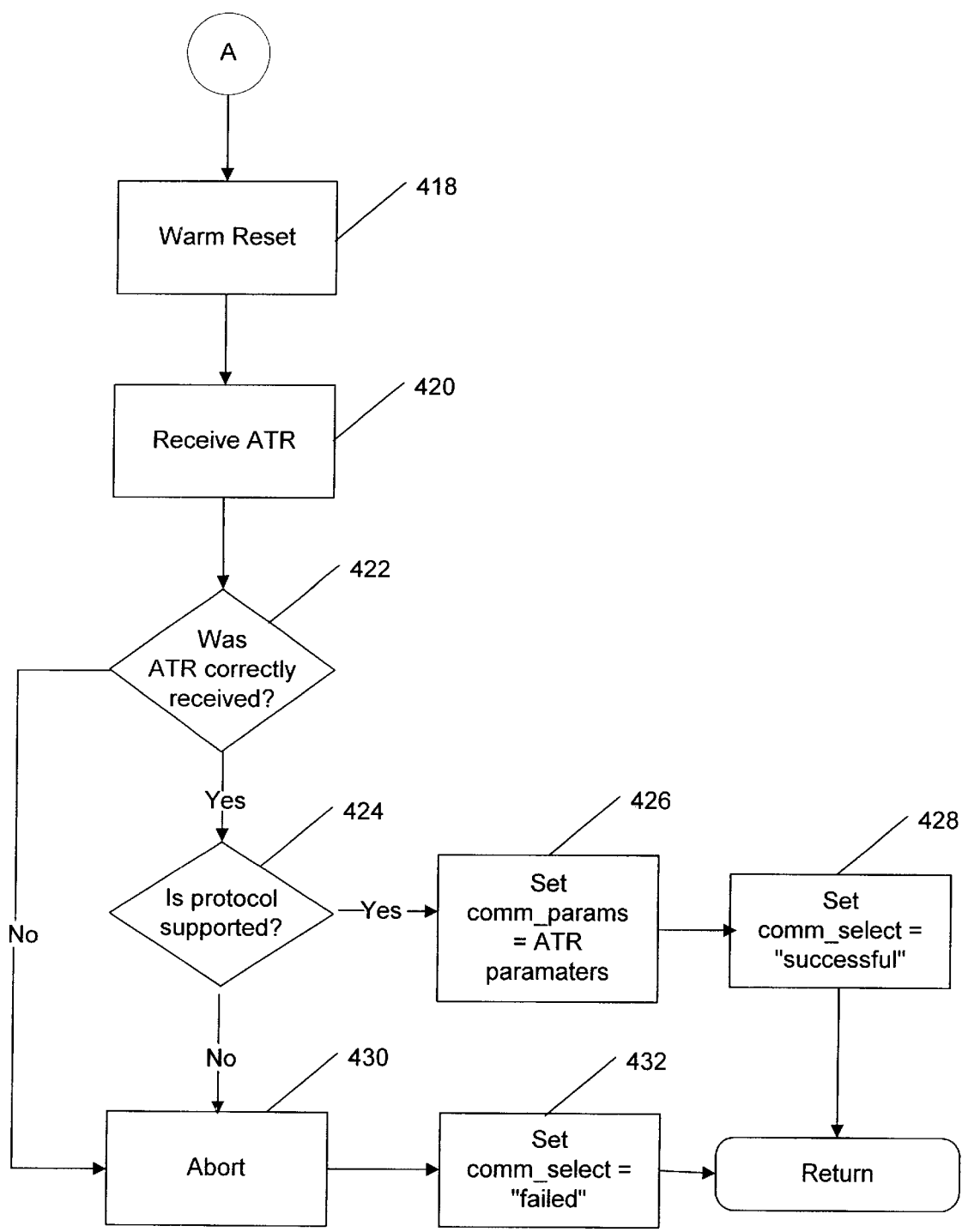

FIGS. 4a and 4b are flow charts of a communications protocol selection routine for execution on a terminal according to a preferred embodiment of the present invention. It is assumed the terminal is able to support at least two communication protocols and that one of the communication protocols is a preferred protocol.

For example, the preferred protocol of the terminal may be a protocol compatible with the EMV '96 Integrated Circuit Card Specifications for Payment Systems, which was developed by MasterCard International Incorporated in conjunction with certain other companies in the payment systems industry to foster global interoperability of IC cards and terminals across competing payment systems.

The EMV '96 Integrated Circuit Card Specifications for Payment Systems was published in June, 1996, and is generally compatible with the ISO/IEC 7816standards. The non-preferred protocol supported by the terminal may be a communications protocol that was used prior to the publication of the EMV '96 Integrated Circuit Card Specifications for Payment Systems.

The routine of FIGS. 4a and 4b utilizes the "cold reset" and "warn reset" features defined in the ISO/IEC 7816-3 standard and Part I of the EMV Integrated Circuit Card for Payment Systems Specification. In these documents, a cold reset is defined as a reset following the activation of the electrical contacts of an IC card (i.e., after the initial application of power and clock signals to the contacts), and a warm reset is defined as a reset following a cold reset, while the power and clock signals are still applied to the IC card.

In step 402 of FIG. 4a, after an IC card has been inserted into the terminal and the electrical contacts of the IC card have been activated, the terminal transmits a cold reset to the IC card. Following the transmission of the cold reset, the terminal receives an "answer-to-reset" (ATR) sent by the IC card in step 404. As defined by the ISO/IEC 7816-3 standard, the ATR is a string of bytes on the input/output line that contains information relating to the communications protocol supported by the IC card, such as the type of the protocol, the bit rate of the protocol, and other timing parameters of the protocol. The ATR required by the EMV specifications is a subset of the ATRs allowed by the ISO/IEC 7816 standards. In step 406, the terminal determines whether the ATR was correctly received by checking parity and other error detection bits included in the ATR. If the ATR was not correctly received, the communication with the IC card is aborted in step 408, the variable comm_select (which indicates to a calling routine whether a communications protocol for communication with the IC card has been successfully selected) is set to "failed" in step 410, and the routine exits.

If the ATR was correctly received, the terminal next determines whether the ATR indicates the preferred communications protocol in step 412. If the preferred communications protocol is indicated, in step 414, the communications variables comm_params are set to the communications parameters contained in the ATR (in this case, the communications parameters of the preferred communications protocol), the variable comm_select is set to "successful," and the routine exits.

Turning to FIG. 4b, if the preferred communications protocol is not indicated by the ATR, a warm reset is issued by the terminal in step 418. After the warm reset is issued, the terminal receives a second ATR from the IC card in step 420. The terminal determines in step 422 whether the second ATR was correctly received by checking the parity and other error correction bits in the second ATR. If the ATR was not received correctly, the communication between the terminal and IC card is aborted in step 432, the variable comm_select is set to "failed" in step 434, and the routine exits.

If the ATR was correctly received, the terminal determines whether the ATR indicates any of the communications protocols supported by the terminal in step 424. If the communications protocol indicated by the ATR is supported by the terminal, the variables comm_params are set to the communications parameters contained in the ATR in step 426, the variable comm_select is set to "successful" in step 428, and the routine exits. Otherwise, the communications with the IC card is aborted in step 430, the variable comm_select is set to "failed" in step 432, and the routine exits.

The communications protocol selection routine of FIGS. 4a and 4b allows a terminal to operate correctly with EMV-compliant cards, pre-EMV cards (assuming the terminal supports the pre-EMV communications protocol), and IC cards that support both EMV and pre-EMV communications protocols.

Figure 6:
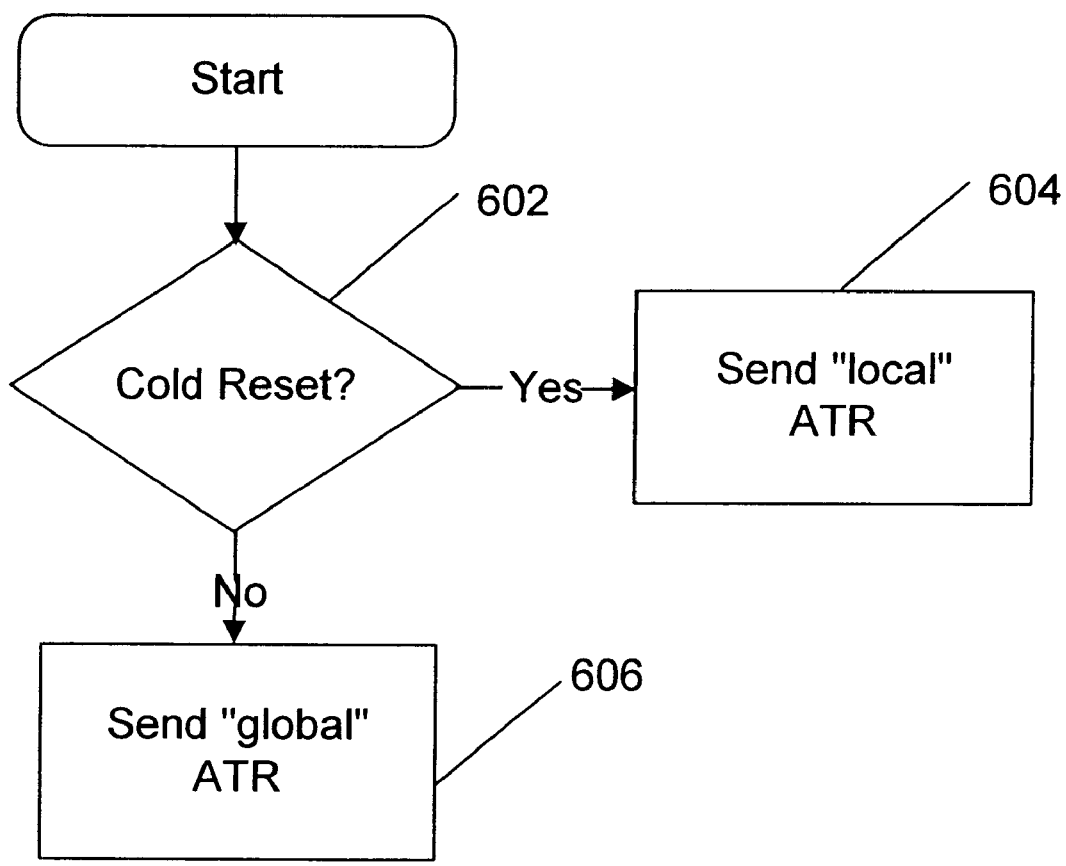
FIG. 6 is a flow chart of an answer-to-reset (ATR) transmission routine for execution on an IC card according to another preferred embodiment of the present invention.

FIG. 6 illustrates a preferred operating system routine for transmitting an ATR by an IC card that supports multiple communications protocols. The IC card stores both a "local" ATR (an ATR valid in a limited geographical region) and a "global" ATR (an ATR valid in a geographical region greater than that associated with the local ATR). As an example, a pre-EMV ATR (which is valid only in a certain country) could be the local ATR, and the EMV ATR (which is valid in multiple countries) could be the global ATR. It is assumed that the IC card is designed to be able to distinguish between a cold reset and a warm reset. It is within the ability of those of ordinary skill in the art to design an IC card that is able to distinguish between a cold reset and a warm reset.

In step 602, the IC card determines whether a reset it has received is a cold reset. If the reset is a cold reset, in step 604 the IC card transmits the local ATR (e.g., a pre-EMV ATR). If the reset is not a cold reset (i.e., it is a warm reset), the IC card transmits the global ATR (e.g., an EMV ATR) in step 606.

Table 1 shows a matrix of the operation of various terminals and IC cards. In Table 1, protocols X and Y refer to pre-EMV communications protocols, which are valid in mutually exclusive regions X and Y, respectively. Moreover, terminals T3 and T4 in Table 1 implement the communications selection routine of FIGS. 4a and 4b, and IC card ICC3 implements the ATR transmission routine of FIG. 6.

Advantageously, the use of IC cards and terminals according to the present invention allows for the interoperability of IC cards and terminals. As shown in Table 1, IC card ICC3 operates correctly in all of the terminals in Table 1. Moreover, it will also be noted that terminal T3 operates correctly with all of the IC cards in Table 1. Furthermore, it will be noted that when IC card ICC3 is inserted into terminal T3, terminal T3 selects the preferred EMV protocol, instead of the preEMV protocol (even though both terminal T3 and IC card ICC3 support the pre-EMV protocol).

In addition, the use of IC cards and terminals according to the present invention advantageously allows for the efficient migration from a pre-EMV protocol to the EMV protocol. To migrate to the EMV protocol in a region, ICC3-type IC cards may be distributed in the region. These cards will operate with the existing pre-EMV terminals (such as T1) and, therefore, re-terminalization of the region is not necessary prior to the distribution of these cards. After distribution of ICC3-type IC cards, EMV-compatible terminals (either T2-type or T3-type terminals) may be added within the region or substituted for existing terminals. The ICC3-type IC cards will operate with both the existing pre-EMV terminals and the new EMV-compatible terminals. Moreover, pre-EMV IC cards (such as ICC1) will operate in both pre-EMV terminals and T3-type terminals. A smooth and easy transition from the pre-EMV protocol to the EMV protocol is therefore possible.

TABLE 1

Interoperability of Various Terminals and IC Cards

| | IC Cards | | | | | |
| --- | --- | --- | --- | --- | --- | --- |
| | ICC1: Pre-EMV Card with Protocol X Support | | ICC2: EMV Card without Pre-EMV Support | | ICC3: EMV Card with Protocol X Support | |
| Terminals | Cold (1st) Reset | Warm (2nd) Reset | Cold (1st) Reset | Warm (2nd) Reset | Cold (1st) Reset | Warm (2nd) Reset |
| T1: Pre-EMV Terminal with Protocol X Support | Pre-EMV ATR issued/ Pre-EMV Operation | n/a | EMV ATR issued/ No operation | n/a | Pre-EMV ATR issued/ Pre-EMV Operation | n/a |
| T2: EMV Terminal without Pre-EMV Protocol Support | Pre-EMV ATR issued | Pre-EMV ATR issued/ No operation | EMV ATR issued/ EMV operation | n/a | Pre-EMV ATR issued | EMV ATR issued/ EMV operation |
| T3: EMV Terminal with Protocol X Support | Pre-EMV ATR issued | Pre-EMV ATR issued/ Pre-EMV operation | EMV ATR issued/ EMV operation | n/a | Pre-EMV ATR issued | EMV ATR issued/ EMV operation |

TABLE 1-continued

Interoperability of Various Terminals and IC Cards

| | IC Cards | | | | | |
|---|---|---|---|---|---|---|
| | ICC1: Pre-EMV Card with Protocol X Support | | ICC2: EMV Card without Pre-EMV Support | | ICC3: EMV Card with Protocol X Support | |
| Terminals | Cold (1st) Reset | Warm (2nd) Reset | Cold (1st) Reset | Warm (2nd) Reset | Cold (1st) Reset | Warm (2nd) Reset |
| T4: EMV Terminal with Protocol Y Support | Pre-EMV ATR issued (protocol X) | Pre-EMV ATR issued (protocol X)/No operation | EMV ATR issued/ EMV operation | n/a | Pre-EMV ATR issued (protocol X) | EMV ATR issued/ EMV operation |

Figure 5A:
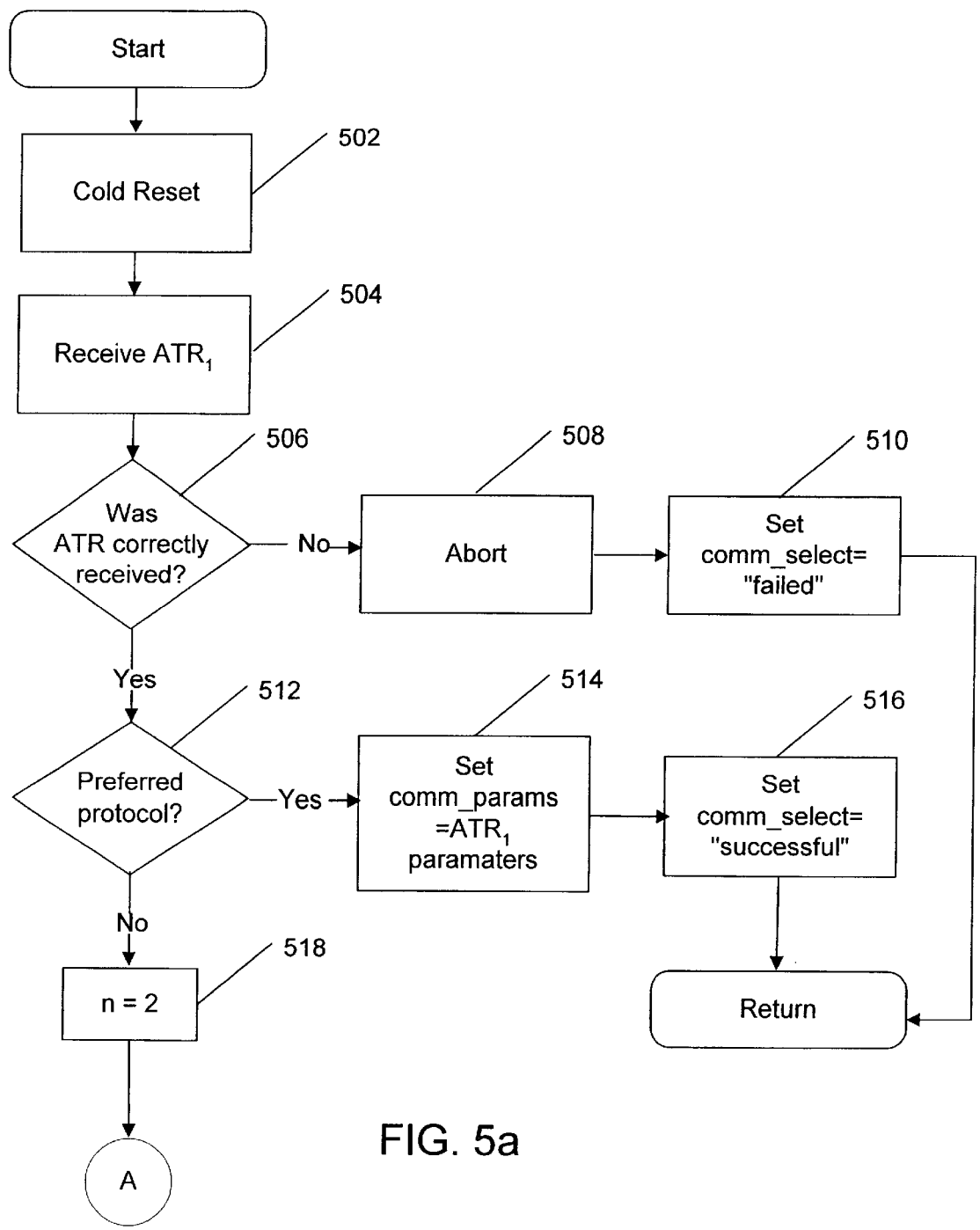
FIGS. 5a and 5b are flow charts of a communications protocol selection routine for execution on a terminal according to another preferred embodiment of the present invention.
Figure 5B:
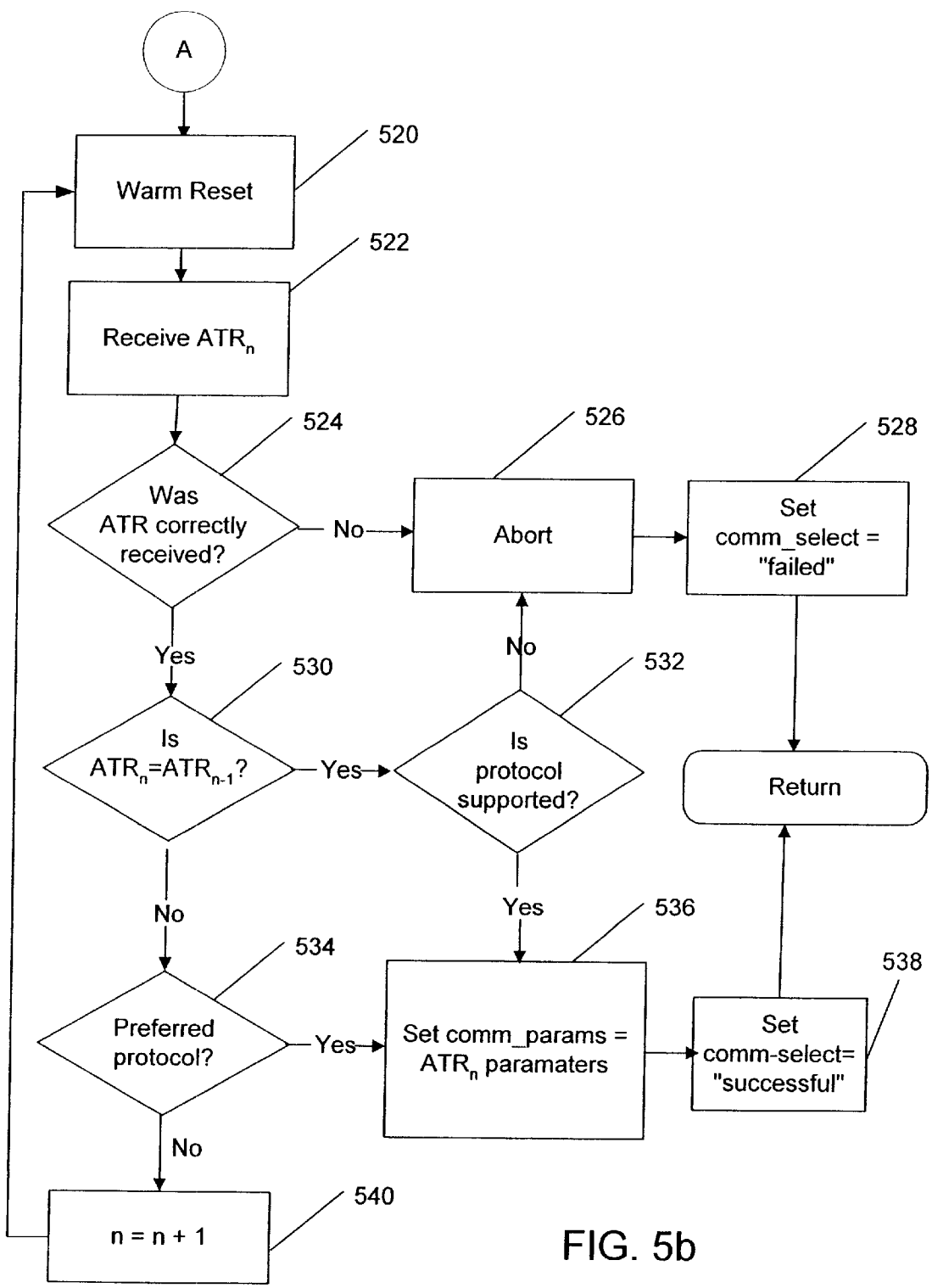

According to another preferred embodiment of the present invention, a terminal may support more than one pre-EMV protocol. FIGS. 5a and 5b are flow charts of a communications protocol selection routine similar to the routine of FIGS. 4a and 4b, but generalized for the case where the terminal supports more than two protocols. As in the embodiment of FIGS. 4a and 4b, it is assumed that one of the communications protocols supported by the terminal is a preferred one. For example, the terminal may support an EMV-compliant communications protocol and multiple pre-EMV communications protocols, and the EMV-compliant communications protocol may be the preferred communications protocol.

In step 502 of FIG. 5a, after an IC card has been inserted into the terminal and the electrical contacts of the IC card have been activated, the terminal transmits a cold reset to the IC card. Following the transmission of the cold reset, the terminal receives an ATR sent by the IC card in step 504. In step 506, the terminal determines whether the ATR was correctly received by checking parity and other error detection bits included in the ATR. If the ATR was not correctly received, the communication with the IC card is aborted in step 508, the variable comm_select is set to "failed" in step 510, and the routine exits.

If the ATR was correctly received, the terminal determines whether the ATR indicates the preferred communications protocol in step 512. If the ATR indicates the preferred communications protocol, the communications variables comm_params are set to the communications parameters contained in the ATR (in this case, the communications parameters of the preferred communications protocol) in step 514, the variable comm_select is set to "successful" in step 516, and the routine exits.

If the preferred communications protocol is not indicated by the ATR, a variable n is set to the value "2" in step 518. Turning to FIG. 5b, the terminal then issues a warm reset in step 520. After the warm reset is issued, the terminal receives another ATR (ATR$_n$) from the IC card in step 522. The terminal determines in step 524 whether the ATR was correctly received by checking the parity and other error correction bits in the ATR. If the ATR was not received correctly, the communication between the terminal and IC card is aborted in step 526, the variable comm_select is set to "failed" in step 528, and the routine exits.

If the ATR was correctly received, the terminal determines whether the current ATR (ATF$_n$) is the same as the previously received ATR (ATR$_{n-1}$) in step 530. If the two ATRs are the same, the terminal determines whether the communications protocol indicated by the current ATR (ATR$_n$) is supported by the terminal in step 532. If the communications protocol indicated by the current ATR is supported by the terminal, the variables comm_params are set to the communications parameters contained in the ATR in step 536, the variable comm_select is set to "successful" in step 538, and the routine exits. Otherwise, if the communications protocol indicated by the current ATR is not supported by the terminal, the communication with the IC card is aborted in step 526, the variable comm_select is set to "failed" in step 528, and the routine exits.

If the current ATR (ATR$_n$) is not the same as the previously received ATR (ATR$_{n-1}$), the terminal determines whether the current ATR indicates the preferred communications protocol in step 534. If the preferred communications protocol is indicated, the variables comm_params are set to the communications parameters contained in the current ATR in step 536, the variable comm_select is set to "successful" in step 538, and the routine exits. Otherwise, the variable n is incremented by one in step 540, and the routine loops to the warm reset step 520.

Figure 7:
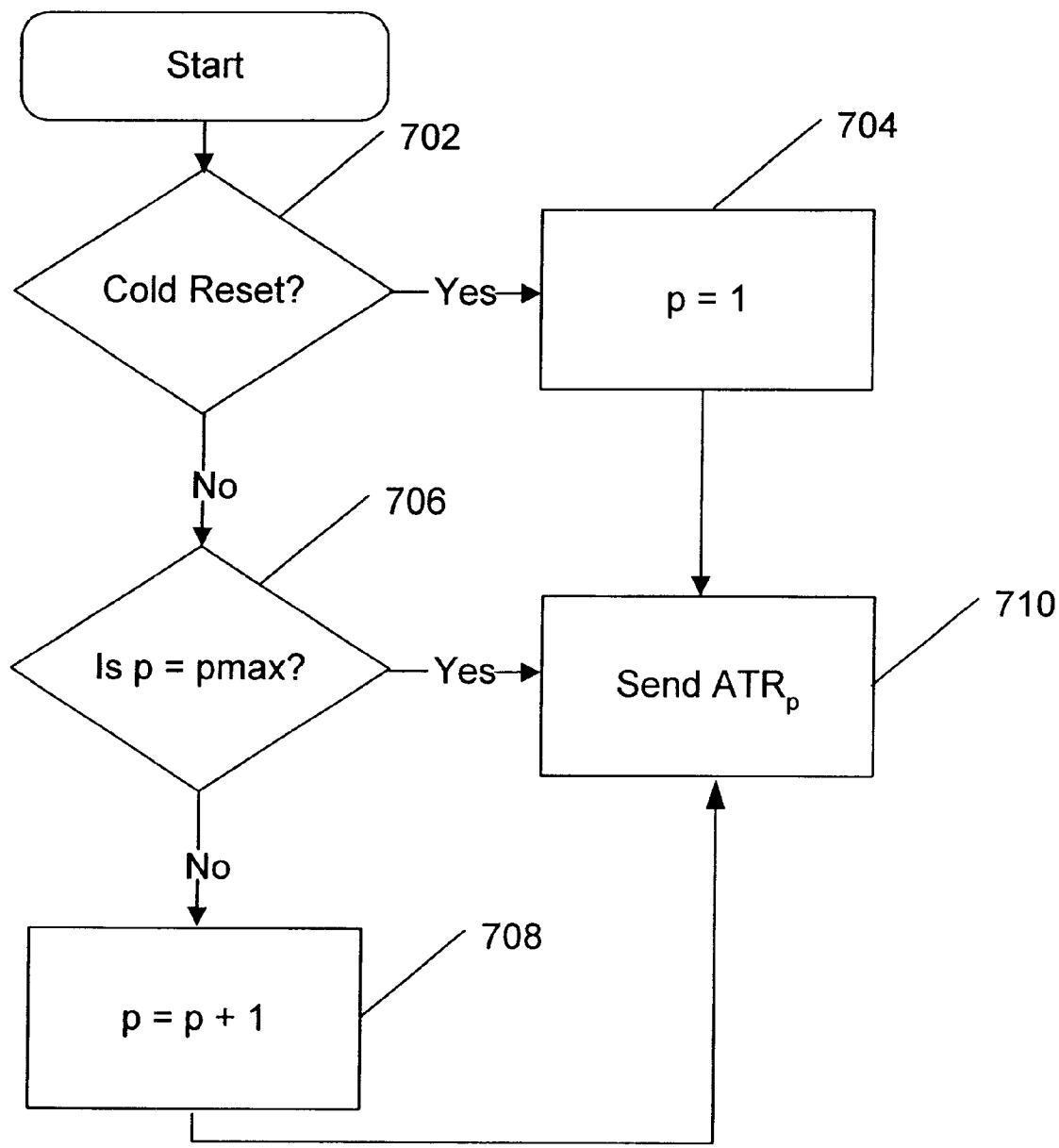
FIG. 7 is a flow chart of an ATR transmission routine for execution on an IC card according to another preferred embodiment of the present invention.

In yet another preferred embodiment of the present invention, an IC card may support more than two communications protocols. FIG. 7 is a flow chart of the steps of an ATR transmission routine for an IC card that supports more than two protocols. In FIG. 7, it is assumed that the IC card has stored therein: (1) in non-volatile memory, a value pmax corresponding to the number of protocols supported by the IC card; (2) in non-volatile memory, a set of ATRs (ATR$_1$, to ATR$_{pmax}$) corresponding to the set of protocols supported by the IC card; and (3) in either volatile or non-volatile memory, a pointer variable p whose value is associated with one of the ATRs in the set of stored ATRs. It is also assumed, for the embodiment of FIG. 7, that the IC card has been designed to be able to distinguish between a cold reset and a warm reset.

In step 702, the IC card determines whether a reset it has received is a cold reset. If so, the IC card initializes the pointer variable p to the value "1" in step 704 and transmits the first ATR (ATR$_1$) in its ATR set in step 710. If the reset is not a cold reset (i.e., it is a warm reset), the IC card determines whether the pointer variable p is equal to pmax in step 706. If p is equal to pmax, the IC card transmits ATR$_p$ in step 710. If p is not equal topmax, the IC card first increments the pointer variable p by one in step 708 and then transmits ATR$_p$ in step 710.

Advantageously, the use of terminals including a communications protocol selection routine according to the present invention and the use of IC cards including an ATR transmission routine according to the present invention provides for a wide range of interoperability of terminals and IC cards and allows for an efficient migration from an existing IC card standard to a new IC card standard.

Although the present invention has been described with reference to certain preferred embodiments, various modifications, alterations, and substitutions will be known or obvious to those skilled in the art without departing from the spirit and scope of the invention, as defined by the appended claims. For example, although the preferred embodiments have been discussed with regard to the EMV protocol, the present invention is not so limited and applies to any communications protocol or standard.

What is claimed is:

1. A method for selecting a communications protocol between an integrated circuit card and a terminal, the terminal being capable of communicating using at least two communications protocols, with one of the at least two communications protocols being a preferred communications protocol, the method comprising:

(a) transmitting a reset by the terminal to the integrated circuit card;

(b) receiving an answer-to-reset by the terminal from the integrated circuit card indicative of a first communications protocol operable in a first geographic region;

(c) determining whether the first communications protocol matches the preferred communications protocol;

(d) transmitting, if the first communications protocol does not match the preferred communications protocol, another reset by the terminal to the integrated circuit card; and (e) receiving another answer-to-reset by the terminal from the integrated circuit card indicative of a second communications protocol operable in a second geographic region which is larger than the first geographic region.

2. The method of claim 1, wherein the reset in step (a) is a cold reset and the reset in step (d) is a warm reset.

3. The method of claim 1, further comprising the steps of:
    determining whether the second communications protocol matches any of the at least two communications protocols supported by the terminal; and
    aborting communications between the terminal and the integrated circuit card if the second communications protocol does not match any of the at least two communications protocols supported by the terminal.

4. The method of claim 1, further comprising the steps of:
    determining whether the second communications protocol matches the first communications protocol;
    if the second communications protocol matches the first communications protocol, determining whether the second communications protocol matches any of the at least two communications protocols supported by the terminal; and
    aborting communications between the terminal and the integrated circuit card if the second communications protocol does not match any of the at least two communications protocols supported by the terminal.

5. The method of claim 4, further comprising the step of, if the second communications protocol does not match the first communications protocol, determining whether the second communications protocol matches the preferred communications protocol.

6. The method of claim 5, further comprising the steps of repeatedly transmitting a reset by the terminal to the integrated circuit card and receiving an answer-to-reset by the terminal from the integrated circuit card until the most current answer-to-reset is the same as a previous answer-to-reset or is indicative of the preferred communications protocol.

7. The method of claim 6, wherein the first communications protocol and the second communications protocol are compliant with, but different subsets of, a communications protocol standard.

8. A method for transmitting an answer-to-reset by an integrated circuit card, the integrated circuit card having a processing unit and a memory coupled to the processing unit, the memory having stored therein a plurality of answers-to-reset, each of the plurality of answers-to-reset being indicative of a communications protocol, and wherein the plurality of answers-to-reset include a first answer-to-reset indicative of a first communications protocol operable in a first geographic region and a second answer-to-reset indicative of a second communications protocol operable in a second geographic region, the second geographic region being greater than the first geographic region, the method comprising:

(a) transmitting one of the plurality of answers-to-reset responsive to a reset; and (b) transmitting another one of the plurality of answers-to-reset responsive to a subsequent reset.

9. The method of claim 8, wherein step (a) comprises transmitting the first answer-to-reset responsive to a cold reset; and wherein step (b) comprises transmitting the second answer-to-reset responsive to a warm reset.

10. The method of claim 8, wherein the memory of the integrated circuit card comprises a pointer stored therein whose value is associated with one of the plurality of answers-to-reset, and wherein the step (b) comprises:
    incrementing the pointer responsive to a reset; and
    transmitting the answer-to-reset associated with the incremented pointer responsive to the reset.

11. The method of claim 10, wherein the incrementing step comprises incrementing the pointer responsive to a reset only if the pointer is less than the number of the plurality of answers-to-reset.

12. The method of claim 10, further comprising the step of initializing the pointer to a predetermined value responsive to a cold reset.

13. The method of claim 8, wherein the communications protocols associated with the plurality of answers-to-reset are each compliant with, but different subsets of, a communications protocol standard.

14. A terminal for communicating with an integrated circuit card comprising:
    a processing unit;
    a memory unit coupled to the processing unit, the memory having stored therein values representative of at least two communications protocols each operable in a different geographic region, with one of the at least two communications protocols being a preferred communications protocol;
    means for transmitting a first reset by the terminal to the integrated circuit card;
    means for receiving a first answer-to-reset from the integrated circuit card responsive to the first reset and indicative of a first communications protocol operable in a first geographic region;
    means for determining whether the first communications protocol matches the preferred communications protocol;
    means for transmitting, if the first communications protocol does not match the preferred communications protocol, a second reset by the terminal to the integrated circuit card; and means for receiving a second answer-to-reset from the integrated circuit card responsive to the second reset and indicative of a second communications protocol operable in a second geographic region which is larger than the first geographic region.

15. The terminal of claim 14, wherein the first reset is a cold reset and the second reset is a warm reset.

16. The terminal of claim 14, further comprising:
means for determining whether the second communications protocol matches any of the at least two communications protocols supported by the terminal; and
means for aborting communications between the terminal and the integrated circuit card if the second communications protocol does not match any of the at least two communications protocols supported by the terminal.

17. The terminal of claim 14, further comprising:
means for determining whether the second communications protocol matches the first communications protocol;
means for determining, if the second communications protocol matches the first communications protocol, whether the second communications protocol matches any of the at least two communications protocols supported by the terminal; and
means for aborting communications between the terminal and the integrated circuit card if the second communications protocol does not match any of the at least two communications protocols supported by the terminal.

18. The terminal of claim 17, further comprising means for determining, if the second communications protocol does not match the first communications protocol, whether the second communications protocol matches the preferred communications protocol.

19. The terminal of claim 18, further comprising means for repeatedly transmitting a reset by the terminal to the integrated circuit card and receiving an answer-to-reset by the terminal from the integrated circuit card until the most current answer-to-reset is the same as a previous answer-to-reset or is indicative of the preferred communications protocol.

20. The terminal of claim 19, wherein the first communications protocol and the second communications protocol are compliant with, but different subsets of, a communications protocol standard.

21. An integrated circuit card comprising:
(a) a processing unit;
(b) a memory coupled to the processing unit, the memory having stored therein a plurality of answers-to-reset, each of the plurality of answers-to-reset being indicative of a communications protocol and wherein the plurality of answers-to-reset include a first answer-to-reset indicative of a first communications protocol operable in a first geographic region and a second answer-to-reset indicative of a second communications protocol operable in a second geographic region, the second geographic region being greater than the first geographic region;
(c) means for transmitting one of the plurality of answers-to-reset responsive to a reset; and
(d) means for transmitting another one of the plurality of answers-to-reset responsive to a subsequent reset.

22. The integrated circuit card of claim 21, wherein the means for transmitting one of the plurality of answers-to-reset comprises means for transmitting the first answer-to-reset responsive to a cold reset; and wherein the means for transmitting another one of the plurality of answers-to-reset comprises means for transmitting the second answer-to-reset responsive to a warm reset.

23. The integrated circuit card of claim 21, wherein the memory of the integrated circuit card comprises a pointer stored therein whose value is associated with one of the plurality of answers-to-reset, and wherein the means for transmitting another one of the plurality of answers-to-reset comprises:
means for incrementing the pointer responsive to a reset; and
means for transmitting the answer-to-reset associated with the incremented pointer responsive to the reset.

24. The integrated circuit card of claim 23, wherein the means for incrementing comprises means for incrementing the pointer responsive to a reset only if the pointer is less than the number of the plurality of answers-to-reset.

25. The integrated circuit card of claim 23, further comprising means for initializing the pointer to a predetermined value responsive to a cold reset.

26. The integrated circuit card of claim 21, wherein the communications protocols associated with the plurality of answers-to-reset are each compliant with, but different subsets of, a communications protocol standard.

27. In a system including a plurality of integrated circuit cards and a plurality of terminals, each of the integrated circuit cards and terminals being capable of communicating with each other through a first communications protocol only, which is operable in a first geographic region, a method for migrating to integrated circuit cards and terminals being capable of communicating with each other through a second communications protocol, which is operable in a second geographic region larger than the first geographic region, comprising the step of issuing one or more integrated circuit cards supporting both said first communications protocol and said second communication protocol, wherein each of said one or more integrated circuit cards supporting both said first communications protocol and said second communications protocol includes:
(a) a processing unit;
(b) a memory coupled to the processing unit, the memory having stored therein a first answer-to-reset indicative of said first communications protocol and a second answer-to-reset indicative of said second communications protocol;
(c) means for transmitting one of the first or second answers-to-reset responsive to a reset; and
(d) means for transmitting the other one of the first or second answers-to-reset responsive to a subsequent request.

28. The method of claim 27, further comprising the step of replacing one or more of said terminals capable of communicating through said first communications protocol only with one or more terminals capable of communicating through said second communications protocol.

29. A system for allowing the interoperability of a plurality of integrated circuit cards and a plurality of terminals each of the integrated circuit cards and each of the terminals being capable of communicating with each other through one or more communications protocols, said system comprising: a matrix of the operation of said integrated circuit cards and terminals, said matrix comprising a series of integrated circuit card communications protocols and a series of terminal support protocols and an indication of the interoperability of each of said series.

30. The system of claim 29, wherein said series of integrated circuit card communications protocols comprises three different communications protocols each having a plurality of answers-to-reset subsets and said series of terminal support protocols comprises four different support protocols.

* * * * *